United States Patent [19]
Horibe et al.
[11] Patent Number: 5,066,550
[45] Date of Patent: Nov. 19, 1991

[54] ELECTRIC CONTACT

[75] Inventors: Kinya Horibe; Tomio Hirano; Minoru Ikeda, all of Shizuoka, Japan
[73] Assignee: Yazaki Corporation, Japan

[21] Appl. No.: 557,102
[22] Filed: Jul. 25, 1990
[30] Foreign Application Priority Data
Jul. 27, 1989 [JP] Japan .................................... 1-92686
[51] Int. Cl.[5] ........................ B32B 15/00; H01H 1/02
[52] U.S. Cl. .................................... 428/670; 428/672; 428/675; 428/680; 428/929; 439/886; 200/266; 200/269
[58] Field of Search ............... 428/929, 670, 675, 680, 428/672; 200/265, 266, 268, 269; 439/886, 887

[56] References Cited
U.S. PATENT DOCUMENTS
3,963,455 6/1976 Nobel et al. .......................... 29/198
4,138,604 2/1979 Harmsen et al. .................... 428/929
4,268,584 5/1981 Ahn et al. .......................... 428/929
4,463,060 7/1984 Updegraff .......................... 428/670
4,465,742 8/1984 Nagashima .......................... 428/672
4,503,131 3/1985 Baudrand ........................... 428/929
4,529,667 7/1985 Shiga et al. ......................... 428/671
4,554,219 11/1985 Gamblin ............................. 428/672
4,626,479 12/1986 Hosoi et al. ......................... 428/672
4,669,697 10/1987 Higuchi ............................. 428/670
4,895,771 1/1990 Souter ................................ 428/672
FOREIGN PATENT DOCUMENTS
160761 11/1985 European Pat. Off. ............ 428/672
3838971 6/1989 Fed. Rep. of Germany .
053894 5/1977 Japan .
018464 2/1978 Japan .
53-139173 12/1978 Japan .................................. 428/929
54-110472 8/1979 Japan .................................. 200/269
54-111678 9/1979 Japan .................................. 200/269
2186597 8/1987 United Kingdom ................ 428/672
WO86/1636 3/1986 World Int. Prop. O. .......... 200/266

*Primary Examiner*—John J. Zimmerman
*Attorney, Agent, or Firm*—Wigman & Cohen

[57] ABSTRACT

In an electric contact having a Cu-based layer, a Ni-based layer formed on the Cu-based layer, and a Pd-based layer formed on the Ni-based layer, the Ni-based layer having a thickness of at least 0.8 μm is so formed as to include a noncrystal nickel alloy layer having a thickness of at least 0.08 μm, in order to reduce the thickness of the Pd-based layer down to about 0.08 μm, that is, the cost of the contact without deteriorating the contact durability, as compared with a 0.6 to 2 μm thick prior-art Pd-based layer.

13 Claims, 1 Drawing Sheet

TABLE

| CONTACT EXAMPLE | Ni (CRY) (μm) | Ni (NONCRY) (μm) | Pd (μm) | Au (μm) | $R_0$ (mΩ) | $R_1$ (mΩ) | I ($R_1/R_0$) |
|---|---|---|---|---|---|---|---|
| A | 0 | 1 | 0.1 | 0 | 0.81 | 0.82 | 1.01 |
| B | 0 | 1 | 0.1 | 0.1 | 0.55 | 0.66 | 1.20 |
| C | 0.7 | 0.3 | 0.1 | 0 | 0.82 | 0.84 | 1.02 |
| D | 0.7 | 0.3 | 0.1 | 0.1 | 0.55 | 0.72 | 1.31 |
| E* | 1 | 0 | 0.1 | 0 | 0.84 | 1012.7 | 1200 |
| F* | 1 | 0 | 0.1 | 0.1 | 0.53 | 50.45 | 95.2 |
| G* | 1 | 0 | 1 | 0 | 0.80 | 1.23 | 1.54 |
| H* | 1 | 0 | 1 | 0.1 | 0.57 | 1.04 | 1.82 |

* : COMPARATIVE CONTACTS
$R_0$: INITIAL RESISTANCE
$R_1$: RESISTANCE AFTER CORROSION TEST

TABLE

| CONTACT EXAMPLE | Ni (CRY) (μm) | Ni (NONCRY) (μm) | Pd (μm) | Au (μm) | $R_0$ (mΩ) | $R_1$ (mΩ) | I ($R_1/R_0$) |
|---|---|---|---|---|---|---|---|
| A | 0 | 1 | 0.1 | 0 | 0.81 | 0.82 | 1.01 |
| B | 0 | 1 | 0.1 | 0.1 | 0.55 | 0.66 | 1.20 |
| C | 0.7 | 0.3 | 0.1 | 0 | 0.82 | 0.84 | 1.02 |
| D | 0.7 | 0.3 | 0.1 | 0.1 | 0.55 | 0.72 | 1.31 |
| E* | 1 | 0 | 0.1 | 0 | 0.84 | 1012.7 | 1200 |
| F* | 1 | 0 | 0.1 | 0.1 | 0.53 | 50.45 | 95.2 |
| G* | 1 | 0 | 1 | 0 | 0.80 | 1.23 | 1.54 |
| H* | 1 | 0 | 1 | 0.1 | 0.57 | 1.04 | 1.82 |

* : COMPARATIVE CONTACTS $R_0$: INITIAL RESISTANCE $R_1$: RESISTANCE AFTER CORROSION TEST

ELECTRIC CONTACT

BACKGROUND OF THE INVENTION

1. Field of the Invention

The present invention relates to an electric contact suitable for use in connector terminals for connecting electric circuits, for instance.

2. Description of the Prior Art

In electric contacts used for connector terminals, it is indispensable that the contact resistance is small and further stable without being subjected to the influence of mechanical friction, heat cycles, exposure to corrosive atmosphere, etc. Therefore, noble metals such as gold, silver, platinum, palladium, etc. excellent in abrasion resistance and corrosion resistance are widely used as the metallic material for electric contacts. However, when the electric contact is formed only of these noble metals, since the cost is high, it has been usual that the copper-based base material is electro-plated with a noble metal.

However, where the noble metal is directly plated on the copper-based base material, there exists a problem in that the contact resistance increases with the elapse of time, because atoms of the metallic base material are diffused into the plated noble metal.

To overcome this problem, conventionally a nickel layer is plated on the base material and then a noble metal layer is further plated on the nickel layer to prevent the atoms of the base material from being diffused into the noble metal layer.

In the noble metals used for the electric contacts, palladium-based metal such as palladium or palladium-nickel alloys are widely used, because the cost is low; the abrasion resistance is high; and the contact resistance is low. Therefore, where electric contacts are formed in accordance with the conventional way, a nickel layer with a thickness of 1 to 2 μm is formed on a copper-based base material (substrate), for instance, and further a palladium-based layer is plated on the nickel layer. In this case, however, it has been well known that the durability of the electric contact, in particular the corrosive resistance thereof is seriously influenced by the thickness of the palladium-based layer formed by plating.

In practice, a 0.6 to 1 μm thick palladium-based layer has been required. Further, where a higher reliability is required in particular, a 1 to 2 μm thick palladium-based layer has been formed. In other words, it has been difficult to reduce the thickness of the costly palladium-based layer, thus increasing the cost thereof.

SUMMARY OF THE INVENTION

With these problems in mind, therefore, it is the primary object of the present invention to provide an electric contact which is low in cost and excellent in contact durability, as compared with the conventional electric contact.

To achieve the above-mentioned object, an electric contact according to the present invention comprises: (a) a metallic base layer; (b) a Ni-based layer formed on said metallic base layer and having a thickness of at least 0.8 μm, said Ni-based layer being formed with a noncrystal Ni-based layer having a thickness of at least 0.08 μm; and (c) a noble metal-based layer formed on said noncrystal Ni-based layer and having a thickness of at least 0.08 μm. Further, it is preferable to form a thin gold layer on the noble-metal-based layer.

Preferably, the thickness of said Ni-based layer is from 0.8 to 2 μm; that of said noncrystal Ni-based layer is from 0.08 to 2 μm; that of the noble-metal-based layer is from 0.08 to 0.5 μm; and that of the gold layer is about 0.1 μm.

The noncrystal Ni-based layer is Ni-P, Ni-B, Ni-Fe-P, Ni-P-W, Ni-Co-P or Ni-W formed by electrolytic or nonelectrolytic plating. Further, the noble-metal-based layer is a palladium or palladium alloy layer formed by electrolytic plating or electrodeposition.

In the electric contact, according to the present invention, composed of a Cu-based layer, a Ni-based layer formed on the Cu-based layer, and a Pd-based layer formed on the Ni-based layer, since the Ni-based layer having a thickness of at least 0.8 μm is so formed as to include a noncrystal nickel alloy layer having a thickness of at least 0.08 μm, it is possible to reduce the thickness of the costly Pd-based layer down to about 0.1 μm, without deteriorating the contact durability. In this connection, in the conventional contact, a 0.6 to 1 μm thick Pd-based layer has been required.

DETAILED DESCRIPTION OF THE PREFERRED EMBODIMENTS

Figures 1, 2:
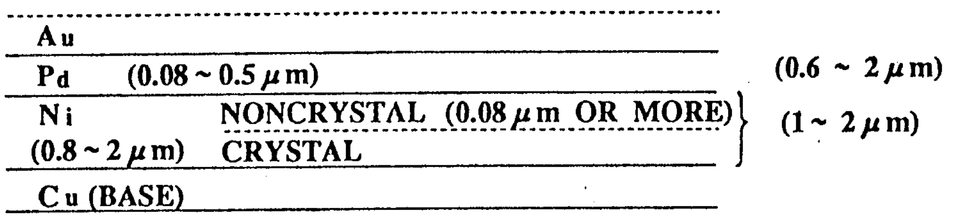
FIG.1 (PRIOR ART)
FIG. 1 is an illustration for assistance in explaining the electric contact layers according to the present invention.
FIG. 2 is a table listing the relationship between contact layer thickness and contact resistance stability, in comparison between test samples according to the present invention and comparative test samples.

The feature of the electric contact according to the present invention is to form an inner Ni-based layer having a thickness from 0.8 to 2 μm (sandwiched between a Cu-based base layer and a Pd-based layer) so as to include a noncrystal Ni-based layer having a thickness of 0.08 μm or more, in order to reduce the thickness of the Pd-based layer down to 0.08 μm.

As shown in FIG. 1, the contact of the present invention is composed of a base (e.g. Cu-based) layer, a 0.8 to 2 μm thick inner nickel-based layer having an inside crystal layer and an outside noncrystal layer having a thickness of 0.08 μm or more, a 0.08 to 0.5 μm thick outer palladium-based layer, and a gold layer where necessary.

The inner nickel-based layer is formed of nickel or nickel alloy so as to have a thickness of at least 0.8 μm, preferably from 1 to 2 μm by plating process for instance. Further, the outside layer thereof is formed of noncrystal nickel-based alloy having a thickness of at least 0.08 μm, preferably 0.1 μm or more or by noncrystal nickel-based alloy only.

The noncrystal nickel alloys are Ni-P, Ni-B, Ni-Fe-P, Ni-P-W, Ni-Co-P, Ni-W, etc. These alloy layers can be formed by electrolytic plating or nonelectrolytic plating.

The outer palladium-based layer is formed of palladium or palladium-nickel alloy on the inner nickel-based layer by electrolytic plating or electrodeposition so that the thickness thereof becomes at least 0.08 μm.

In the electric contact according to the present invention, since the outer palladium-based layer is formed on the inner nickel-based layer, the contact resistance is low and the durability is excellent. However, it is also preferable to cover the outer palladium-based layer with a thin gold layer when a lower contact resistance is required. The gold layer is effective with respect to an improvement in contact resistance; however, the gold layer does not exert a specific influence upon the durability.

The electric contact according to the present invention formed as described above provides an excellent durability and in particular a stable contact resistance within a corrosive atmosphere for many hours.

EXAMPLE 1

A polished brass plate (C 2600) was purified by alkali degreasing, electrolytic degreasing and dilute sulfuric acid washing. An inner nickel-phosphorus alloy layer having a thickness of 1 μm was formed on the purified brass plate by nickel plating for 60 seconds at a current density of $5A/dm^2$ within a water electrolytic plating bath including nickel sulfate of 300g/l, nickel chloride of 45g/l, boric acid of 45g/l, and phosphorus acid of 10g/l at 55° C. It was confirmed that the formed nickel-phosphorus alloy was noncrystal by X-ray diffraction technique and included 13.5% (by weight) phosphorus with an electron photomicroanalyzer.

Thereafter, an outer palladium-nickel alloy layer having a thickness of 0.1 μm and 20% (by weight) nickel was formed on the inner Ni-p alloy layer by palladium plating for 2.5 seconds at a current density of $10A/dm^2$ within a water electrolytic plating bath including palladium chloride of 67g/l, nickel chloride of 121.5g/l, ammonium chloride of 30g/l, 30% aqueous ammonia of 400ml/l, and sodium naphthalene trisulfonic acid of 1.74g/l at 55° C.

The electric contact plate A thus obtained comprises an inner 1 μm-thick noncrystal nickel-phosphorus alloy layer and an outer 0.1 μm-thick palladium-nickel alloy layer.

EXAMPLE 2

A 0.1 μm-thick gold layer was further formed on the electric contact A (Example 1) by gold plating for 20 seconds at a current density of $5A/dm^2$ within a gold plating bath (AUROBRIGHT-HS 10 made by KŌJUNDO KAOAKU Co. Ltd.) at 60° C.

The electric contact plate B thus obtained comprises an inner 1 μm-thick noncrystal nickel-phosphorus alloy layer, an outer 0.1 μm-thick palladium-nickel alloy layer, and a 0.1 μm-thick gold layer.

EXAMPLE 3

A polished brass plate was purified in the same way as in Example 1. An inner nickel layer having a thickness of 0.7 μm was formed on the purified brass plate by nickel plating for 43 seconds at a current density of $5A/dm^2$ within a plating bath including nickel sulfate of 300g/l, nickel chloride of 45g/l and boric acid of 45g/l at 55° C. It was confirmed that the formed nickel layer was crystal by X-ray diffraction technique. Further, a nickel-boron alloy layer having a thickness of 0.3 μm is formed on the above crystal nickel layer on the nickel-plated brass plate by plating for 145 seconds within a water nonelectrolytic plating bath including nickel sulfate of 15g/l, sodium citrate of 52g/l, dimethylamineboron of 3.0g/l, and boric acid of 31g/l and adjusted to pH 7 by sodium hydroxide at 70° C. It was confirmed that this nickel alloy layer was noncrystal by X-ray diffraction technique.

Thereafter, an outer palladium-nickel alloy layer having a thickness of 0.1 μm was formed on the nickel-boron alloy layer by plating for 25 seconds at a current density of $10A/dm^2$ within the same water electrolytic plating bath for palladium-nickel alloy as in the Example 1 at 55° C.

The electric contact plate C thus obtained comprises an inner 1 μm-thick nickel-based metallic layer composed of a 0.7 μm-thick crystal nickel layer and another 0.3 μm-thick noncrystal nickel-boron alloy metallic layer and an outer 0.1 μm-thick paradium-nickel alloy metallic layer.

EXAMPLE 4

A 0.1 μm-thick gold layer was further formed on the electric contact C (Example 3) by gold plating in the same way as in Example 2.

The electric contact plate D thus obtained comprises an inner 1 μm-thick nickel-based metallic layer composed of a 0.7 μm-thick crystal nickel layer and another 0.3 μm-thick noncrystal nickel-boron alloy metallic layer, an outer 0.1 μm-thick palladium-nickel alloy metallic layer, and a 0.1 μm-thick gold layer.

COMPARATIVE EXAMPLE 1

A polished brass plate was purified in the same way as in the Example 1. An inner 1 μm-thick nickel-phosphorus alloy layer the same as in the Example 1 was formed by nickel plating within the crystal nickel plating bath the same as in the Example 3, in place of the noncrystal nickel plating bath used in the Example 1. An outer palladium-nickel alloy layer was formed in quite the same way as in the Example 1.

The electric contact plate E thus obtained comprises an inner 1 μm-thick crystal nickel layer and an outer 0.1 μm-thick palladium-nickel alloy layer.

COMPARATIVE EXAMPLE 2

A 0.1 μm-thick gold layer was formed on the electric contact E obtained in the Comparative Example 1 by the same gold plating method as in the Example 2.

The electric contact plate F thus obtained comprises an inner 1 μm-thick crystal nickel layer, an outer 0.1 μm-thick palladium-nickel alloy layer, and a 0.1 μm-thick gold layer.

COMPARATIVE EXAMPLE 3

An inner 0.1 μm-thick crystal nickel layer was formed in the same way as in the Comparative Example 1.

Thereafter, an outer 1 μm-thick palladium-nickel alloy layer was formed by plating for 24 seconds at a current density of $10A/dm^2$ within the same water electrolytic palladium-nickel alloy plating bath the same as in Example 1 at 55° C.

The electric contact plate G thus obtained comprises an inner 1 μm-thick crystal nickel layer and an outer 1 μm-thick palladium-nickel alloy layer.

COMPARATIVE EXAMPLE 4

A 0.1 μm-thick gold layer was formed on the electric contact G obtained in the Comparative Example 3 by the same gold plating method as in the Example 2.

The electric contact plate H thus obtained comprises an inner 1 μm-thick crystal nickel layer, an outer 1 μm-thick palladium-nickel alloy layer, and a 0.1 μm-thick gold layer.

TEST METHOD

The surface roughness of each of the above-mentioned electric contact Examples A to H was measured. The value of each Comparative Example having an inner crystal nickel layer was Ra=20 to 30 nm, while that of each Example having an inner noncrystal nickel layer was Ra=6 to 8 nm.

FIG. 2 shows a table listing the relationship between the above-mentioned thickness of each layer of each Example and the corrosion resistance of each Example.

In the table, $R_0$ denotes the initial average electric contact resistance (m ohm) of 30 contacts measured when a gold pin with a radius of curvature of 0.5 mm was brought into contact with the contact plates under a load of 100 g. $R_1$ denotes the aged electric contact resistance (m ohm) of the same number of contacts measured after the test samples had been kept for 24 hours within an air including 25 ppm sulfur dioxide at 90% (relative humidity) and 40° C. I denotes the ratio ($R_1/R_0$) of the aged contact resistance ($R_1$) to the initial contact resistance ($R_0$).

The table shown in FIG. 2 indicates that the contact examples according to the present invention are excellent in corrosion resistance I ($=R_1/R_0$), in spite of thin (0.1 μm) palladium-nickel alloy layer. This corrosion resistance corresponds to that of a thick (1 μm) palladium-nickel alloy layer of the conventional contact.

In the electric contact according to the present invention, since an inner nickel-based layer having a thickness of at least 0.8 μm is formed so as to include a noncrystal nickel alloy layer having a thickness of at least 0.08 μm, it is possible to reduce the thickness of the outer palladium-based layer down to 0.08 μm without deteriorating the contact durability, thus markedly reducing the amount of costly noble material and therefore the cost of the electric contact.

In the above examples, only palladium-based layers have been explained as a noble-metal-based layer by way of example. Without being limited thereto, however, it is also possible to form the noble-metal-based layer of gold, silver, platinum or its alloy.

What is claimed is:

1. An electric contact comprising:

a) a metallic base layer;

b) a Ni-based layer formed on said metallic base layer and having a thickness of from about 0.8 to about 2 μm, said Ni-based layer being formed with a noncrystal Ni-based layer having a thickness of at least 0.08 μm and with a crystal Ni-based layer having a thickness of less than about 1.92 μm; and c) a noble-metal-based layer formed on said noncrystal Ni-based layer having a thickness of at least about 0.08 μm.

2. The electric contact of claim 1, which further comprises a gold layer formed on said noble-metal-based layer.

3. The electric contact of claim 2, wherein thickness of said gold layer is about 0.1 μm.

4. The electric contact of claim 1, wherein thickness of said noble-metal-based layer is from 0.08 to 0.5 μm.

5. The electric contact of claim 1, wherein said metallic base layer is a Cu-based layer.

6. The electric contact of claim 1, wherein said noble-metal-based layer is a palladium-based layer.

7. The electric contact of claim 6, wherein said palladium-based layer is a palladium layer.

8. The electric contact of claim 6, wherein said palladium-based layer is a palladium-nickel alloy layer.

9. The electric contact of claim 6, wherein said palladium-based layer is formed by electrolytic plating.

10. The electric contact of claim 6, wherein said palladium-based layer is formed by electrodeposition.

11. The electric contact of claim 1, wherein said noncrystal Ni-based layer is a layer selected from the group consisting of Ni-P, Ni-B, Ni-Fe-P, Ni-P-W, Ni-Co-P or Ni-W.

12. The electric contact of claim 11, wherein said noncrystal Ni-based layer is formed by electrolytic plating.

13. The electric contact of claim 11, wherein said noncrystal Ni-based layer is formed by nonelectrolytic plating.

* * * * *